No. 649,398. Patented May 8, 1900.
V. J. BUSSON.
PRIMARY ELECTRIC BATTERY.
(Application filed Nov. 18, 1898.)
(No Model.)
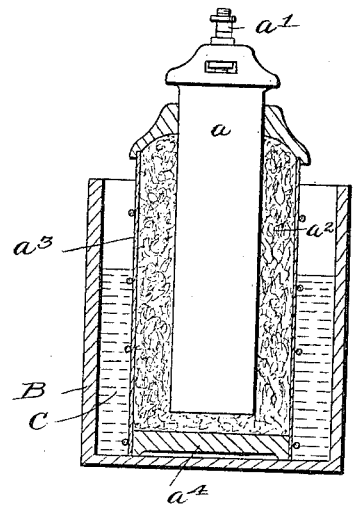
Witnesses:
C. D. Kesler.
Geo. W. Rea.
Inventor
Victor J. Busson
By James L. Norris
Atty

UNITED STATES PATENT OFFICE.

VICTOR JULIEN BUSSON, OF PARIS, FRANCE.

PRIMARY ELECTRIC BATTERY.

SPECIFICATION forming part of Letters Patent No. 649,398, dated May 8, 1900.

Application filed November 18, 1898. Serial No. 696,808. (No model.)

*To all whom it may concern:*

Be it known that I, VICTOR JULIEN BUSSON, electrician, a citizen of the Republic of France, residing at 15 Rue des Vertus, Paris, in the Republic of France, have invented certain new and useful Improvements in or Relating to Primary Electric Batteries, of which the following is a specification.

This invention has for its object an improved primary electric battery which shall be capable of producing a current of great constancy and may be applied either to a dry battery—*i. e.*, one in which the liquid is absorbed by a suitable porous substance, such as shavings or plaster—or a liquid battery.

The essential feature of the invention consists in the composition of the negative electrode, which is formed of an agglomeration of one or more metallic oxids, together with carbon, plumbago, or the like, these substances being pulverized and mixed together with a solution of the sulfate of the metal to be used as the soluble or positive electrode. The electrolyte in these batteries is preferably sal-ammoniac.

The following is an example of the substances and their proportions for a suitable negative electrode made according to this invention when the soluble or positive electrode is composed of zinc: plumbago, one part by weight; manganese dioxid, four parts by weight; sulfate-of-zinc solution of a suitable degree of concentration, one part by weight. The plumbago and dioxid of manganese are powdered and mixed with the sulfate-of-zinc solution, and this mixture is compressed around a block of carbon provided with a contact-screw.

In order to avoid the risk of the disintegration of the agglomerate mass forming the negative electrode, it may be inclosed in a permeable envelop or casing of a substance that the battery does not attack—such, for instance, as a bag of canvas, asbestos, or similar substance.

The positive electrode consists of zinc and may conveniently form the outer vessel itself, and the electrolyte in this case consists of a solution of ammonium chlorid.

A battery thus constituted has an electromotive force 1.6 volts and is remarkably constant. Its internal resistance depends, other things being equal, upon the surface area of the electrode.

In the foregoing example the positive electrode is of zinc; but it will be readily understood that this electrode may be of any suitable metal that can be attacked.

The battery may, if deemed necessary, be closed at the top by means of insulating material.

My invention is illustrated in the accompanying drawing, in which the figure is a sectional view.

In said drawing the negative electrode comprises a carbon block $a$, provided with a contact-screw $a'$ and having the mixture of plumbago and manganese dioxid moistened with sulfate-of-zinc solution $a^2$, compressed around it and inclosed in a permeable casing of canvas, asbestos, or similar substance $a^3$.

$a^4$ is insulating material.

B is the outer casing of zinc, forming the positive electrode.

C is ammonium chlorid constituting the electrolyte.

In the primary batteries heretofore employed of the kind in which the positive electrode is zinc the electrolyte is chlorid of ammonia and the agglomerated negative electrode has been moistened with chlorid of zinc. Upon working the battery the ammonia liberated at the depolarizing-electrode combines with the zinc chlorid to form zinc oxid. This zinc oxid is precipitated in the presence of an excess of zinc chlorid, forming an oxychlorid of zinc, which gradually cements and hardens the depolarizing compound, and thereby after a while prevents good contact between the central part of the depolarizing compound and the conducting liquid, causing the internal resistance of the cell to increase and the capacity of the cell to decrease.

By the use of the sulfate solution to moisten the agglomerated negative electrode, as above described, these defects are obviated. When the battery is worked, the liberated ammonia attacks the sulfate of zinc, causing only the precipitation of hydrated zinc oxid, which does not cement or harden the agglomerated negative electrode, the latter remaining soft after use.

What I claim is—

1. In a primary electric battery, a negative electrode consisting in an agglomeration of metallic oxid and carbon moistened with a metallic-sulfate solution, and a positive electrode consisting of the same metal as that which forms the base of the said sulfate solution, substantially as described.

2. A primary electric battery comprising an electrolyte consisting of a salt, a negative electrode consisting in an agglomeration of metallic oxid and carbon moistened with a metallic-sulfate solution, and a positive electrode consisting of the same metal as that which forms the base of the said sulfate solution, substantially as described.

3. A primary electric battery comprising an electrolyte consisting of a solution of ammonia chlorid, a negative electrode consisting in an agglomeration of plumbago and manganese dioxid moistened with sulfate-of-zinc solution, and a positive electrode composed of zinc, substantially as described.

4. A primary electric battery comprising an electrolyte of ammonia chlorid, a negative electrode consisting in plumbago and manganese dioxid moistened with a solution of sulfate of zinc and agglomerated around a carbon block, a permeable case inclosing said negative electrode, and a positive electrode composed of zinc, substantially as described.

In testimony whereof I have hereunto set my hand, in presence of two subscribing witnesses, this 31st day of October, 1898.

VICTOR JULIEN BUSSON.

Witnesses:
J. ALLISON BOWEN,
ENRIQUE BAER.